United States Patent [19]
Devenport et al.

[11] Patent Number: 6,108,119
[45] Date of Patent: Aug. 22, 2000

[54] METHODS AND APPARATUS FOR MONITORING AND CONTROLLING OPTICAL MODULATOR SIGNAL QUALITY

[75] Inventors: Kent E. Devenport, Fort Collins, Colo.; Joseph Earl Ford, Oakhurst, N.J.; Ashok V. Krishnamoorthy, Middletown, N.J.; Ted Kirk Woodward, Holmdel, N.J.

[73] Assignee: Lucent Technologies Inc., Murray Hill, N.J.

[21] Appl. No.: 09/021,745

[22] Filed: Feb. 11, 1998

[51] Int. Cl.[7] .................................................. G02F 1/07
[52] U.S. Cl. ........................... 359/248; 359/237; 359/181
[58] Field of Search ..................................... 359/248, 181, 359/187, 247, 237

[56] References Cited

U.S. PATENT DOCUMENTS

| 5,546,218 | 8/1996 | Komatsubara et al. | 357/237 |
| 5,706,117 | 1/1998 | Imai et al. | 359/187 |

FOREIGN PATENT DOCUMENTS

| 6-164049 | 6/1994 | Japan . |
| 9-179079 | 7/1997 | Japan . |
| 9-230295 | 9/1997 | Japan . |

*Primary Examiner*—Loha Ben
*Attorney, Agent, or Firm*—Law Offices of Peter H. Priest

[57] ABSTRACT

Automatic bias setting circuits for multiple quantum well (MQW) diodes and optical modulators generally are described. Both digital and analog circuits are provided and techniques for utilizing such circuits for monitoring and controlling optical modulator signal quality are disclosed. In one approach, a desired modulation voltage range is determined. A bias voltage is stepped from a first predetermined voltage up to a second predetermined voltage. A maximum differential photocurrent is determined and the bias voltage corresponding to that photocurrent is then employed so that optimal optical modulator signal quality is achieved. An advantageous application of this technique is in wavelength division multiplexed (WDM) systems in which different optical modulators are operating at different wavelengths. In such a system, a different voltage bias will typically be determined for each optical modulator.

23 Claims, 6 Drawing Sheets

METHODS AND APPARATUS FOR MONITORING AND CONTROLLING OPTICAL MODULATOR SIGNAL QUALITY

FIELD OF THE INVENTION

The present invention relates generally to improvements in optical signal modulation. More particularly, the present invention relates to improvements allowing automatic adjustment of optical modulators over a wide range of monochromatic signal wavelengths and temperatures.

BACKGROUND OF THE INVENTION

Normal-incidence, high-speed, optical modulators are attractive devices for optical fiber communication because they can be interfaced to optical fibers more easily than waveguide-based devices. They are also interesting for integration with high-complexity Si CMOS because of their ability to provide large amounts of optical I/O directly to VLSI chips. There are various technological hurdles to be overcome before such devices would be interesting for widespread use in lightwave communications applications. The first of these is the production of modulator materials of sufficient quality to permit operation at the 1.55 micron wavelengths used in most modern telecommunication systems. A second obstacle is to design a modulator that will function with a modest applied voltage while still producing the high-contrast levels (10:1) desired in lightwave systems. Additionally, a significant temperature dependence of the modulation performance is observed when other operating variables (voltage, wavelength, etc.) are fixed. Furthermore, with the emergence of wavelength division multiplexed (WDM) systems, it may be desirable to operate normal-incidence optical modulators with sources that span a range of wavelengths, either near 850 nm, 1300 nm, or 1550 nm.

Normal-incidence optical modulators have an optical transmission (or reflection, for two-passes through the material) that depends upon the voltage applied to the device when the incident light falls within the proper wavelength range, as well as upon the temperature of the device, as a result of the temperature dependence of the semiconductor energy gap. For example, a reflective optical modulator used at room temperature might have a reflectivity versus wavelength characteristic similar to that shown in FIG. 4, and further described below, where the different traces correspond to different voltages applied to the device. It is desirable to obtain a large change in optical transmission from the modulator. Furthermore, in many cases one wishes to operate between two discrete states, one of low reflectivity and the other of high reflectivity. As can be seen from FIG. 4, different bias levels are more appropriate for different wavelengths of illumination. For instance, if we consider the change in reflectivity that can be obtained for operation at 855 nm, we might discover that the optimum bias levels to provide the maximum change in reflectivity are 0 V and 6 V. On the other hand, were we to operate at 860 nm, the optimum operating voltages would be different. Additionally, since the semiconductor bandgap shifts at approximately 0.3 nm per degree Celsius, the optimum operating voltage for a given wavelength will change with temperature.

SUMMARY OF THE INVENTION

The present invention provides methods and apparatus for automatically determining and controlling the bias levels at which an optical modulator will exhibit the maximum or a desired difference in transmitted (or reflected) light. It should be noted that this optimization is highly suitable for large signal modulation, as opposed to small signal radio frequency (RF) modulation wherein one optimizes on the first derivative of photocurrent versus voltage characteristics. As discussed above, optical modulator performance varies significantly with changes in illumination wavelength, device temperature and reverse bias voltage. Efficient system implementation requires optimum modulator performance, but highly parallel systems are difficult to adjust manually and manual adjustment of low cost production systems is not desirable. Thus, methods and apparatus for automatic bias setting of optical modulators are highly desirable.

In one aspect, the present invention relies on the presence of a photocurrent that is proportional to the amount of light being modulated. For an absorption modulator, this is the amount of light absorbed. For a non-absorptive modulator, a monitor photodiode may be utilized to sense the amount of light modulation. Hereinafter, this current will referred to as "photocurrent" whether it is intrinsic to the optical modulator or arises from the monitor photodiode which views the reflected light of the optical modulator. The invention compensates for variations in the wavelength and temperature by providing a control circuit that adjusts the bias level on an optical modulator to optimize photocurrent contrast.

By monitoring the photocurrent at each bias point, the two bias levels at which the modulator will exhibit the maximum difference in transmitted (or reflected) light can be determined. This is done by identifying the two bias points at which the difference in photocurrent is maximized. These bias points are separated from one another by the drive voltage or voltage swing available. Since the photocurrent is directly related to the modulated light, this bias difference must correspond to the optimum bias level for the particular wavelength of light being supplied to the device.

This invention is particularly advantageous when it is desired to operate an array of modulators with a variety of wavelengths impressed upon them, for example, in a wavelength division multiplexed (WDM) system. There each modulator is supplied with a different wavelength, and thus a different bias setting is appropriate for each modulator.

The present invention will also permit the determination of the appropriate bias voltage for achieving an arbitrary specified voltage difference between the on and off levels of a modulator. This is important because the two optimum voltage levels may be different depending upon the voltage swing permitted. For example, if a 5 volt swing is permissible or desired, the bias voltage level, or prebias would likely be different than for the case in which a 10 volt swing is allowed. By maximizing the photocurrent difference between states for a given difference in the operating voltage levels, the optimum prebias can be determined for any desired voltage difference.

A more complete understanding of the present invention, as well as further features and advantages, will be apparent from the following Detailed Description and the accompanying drawings.

DETAILED DESCRIPTION

The present invention provides methods and apparatus for automatically determining and controlling the bias levels at which an optical modulator will exhibit the maximum difference or attain a predetermined difference in either transmitted or reflected light. It will be recognized that a normal incidence optical modulator may typically have a reflective backing so that light which enters the modulator is reflected off the backing and exits the modulator on the same side that it enters. The present invention will be described more fully hereinafter with reference to the accompanying drawings, in which several presently preferred embodiments of the invention are shown. This invention may, however, be embodied in various forms and should not be construed as limited to the embodiments set forth herein. Rather, applicants provide these embodiments so that this disclosure will be thorough and complete, and will fully convey the scope of the invention to those skilled in the art.

Figure 1:
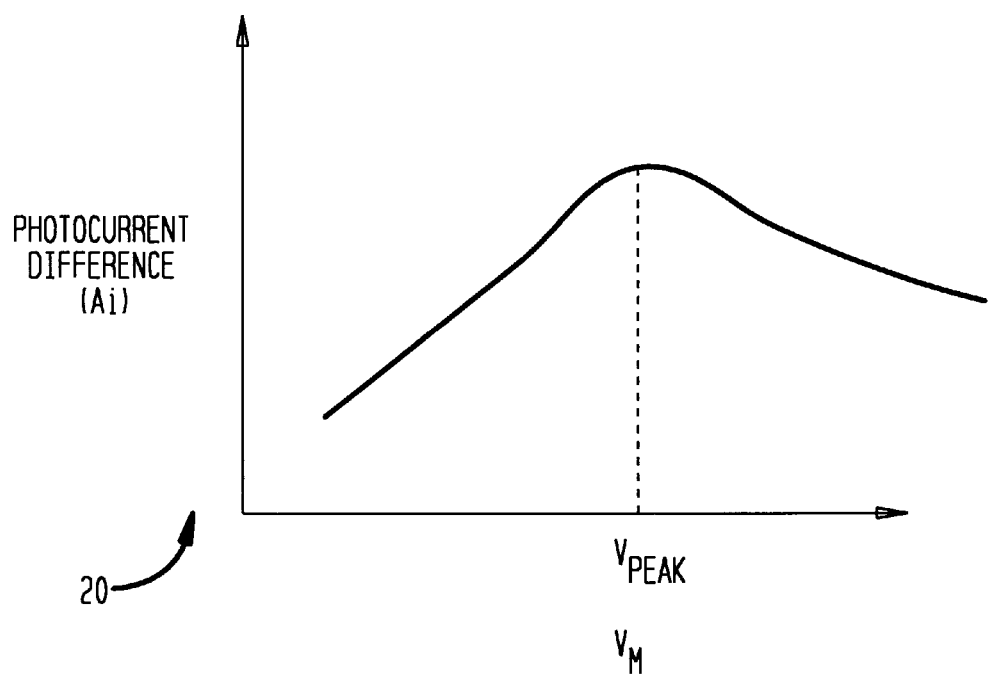
FIG. 1 is a graph showing the relationship between the photocurrent through an optical modulator and the bias voltage.

FIG. 1 shows a graph 20 illustrating the relationship between the photocurrent difference ΔI between two states separated in voltage by the available drive voltage $V_{mod}$ arising in an optical modulator, and a prebias voltage $V_M$. By adjusting the prebias voltage so that $V_M=V_{PEAK}$, the contrast provided by the modulator will be optimized, for the given drive voltage.

Figure 2:
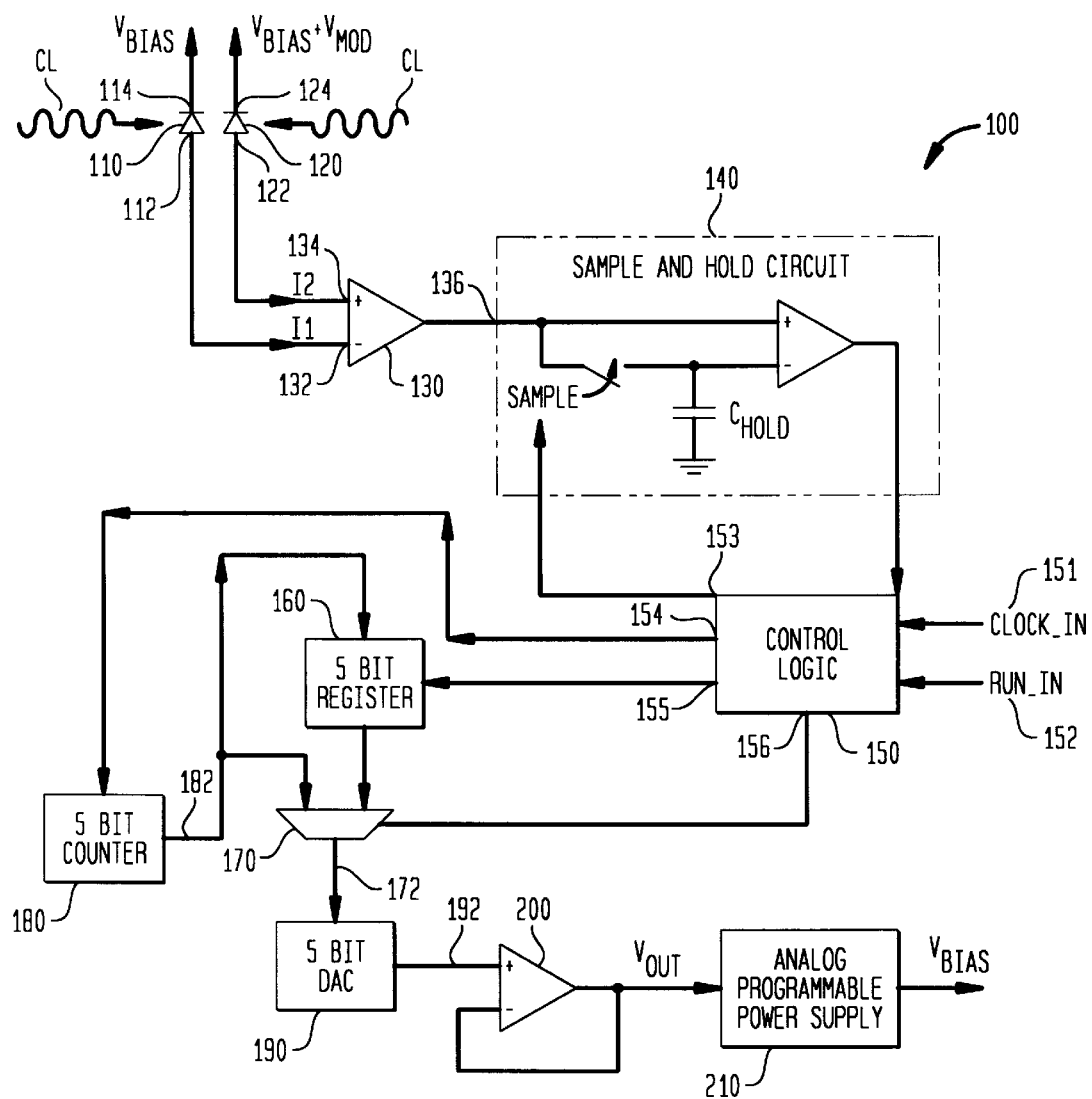
FIG. 2 is a schematic diagram of a digital implementation of an automatic bias setting circuit in accordance with the present invention.

FIG. 2 is a schematic diagram of a digital implementation of an automatic bias setting circuit 100 in accordance with the present invention. The exemplary circuit 100 includes two monitor photodiodes 110 and 120 which are preferably normal incidence high speed multiple quantum well (MQW) diodes. While the discussion which follows is for MQW diodes, it will be recognized that the present teachings are widely applicable to other devices requiring biasing of the nature described herein to improve their operational stability. For example, it will be recognized that the present invention may be adapted to non-absorption-based optical modulators by employing a monitor absorption-based photodiode to monitor the reflection or transmission of the non-absorption-based optical modulator.

A first terminal 112 of the photodiode 110 is connected to an input 132 of an operational amplifier 130, while another terminal 114 is biased at a first voltage level $V_{bias}$. A first terminal 122 of the photodiode 120 is connected to an input 134 of the operational amplifier 130, while another terminal 124 is biased at a second voltage level $V_{bias}+V_{mod}$. Both of the MQW diodes 110 and 120 are typically exposed to a continuous source of coherent light CL having a predetermined wavelength. In actual operation, light CL would be the light to be modulated during operation of either diode as an optical modulator.

An output 136 of the operational amplifier 130 is connected to a sample-and-hold circuit 140. The output of the sample-and-hold circuit 140 in turn is connected as an input to a control logic circuit or processor 150. Signals Clock_In 151 and Run_In 152 are also connected as inputs to the control logic circuit 150. The control logic circuit 150 generates an output 153 which is connected to and controls the sampling of the sample and hold circuit 140. Three other outputs 154, 155, and 156 of the control logic circuit 150 are connected to a counter 180, a register 160, and a multiplexer 170, respectively. An output 182 of the counter 180 is also connected to the register 160 and the multiplexer 170. An output of the register 160 serves as a further input to the multiplexer 170. The multiplexer 170 produces an output 172 which is connected to a digital-to-analog (DAC) converter 190. An output 192 of the digital-to-analog converter 190 is connected to an input of an operational amplifier 200. An output ($V_{out}$) of the operational amplifier 200 is connected to an input of an analog programmable power supply 210. The analog programmable power supply 210 produces as its output the voltage $V_{bias}$ which as described further below serves as the source of $V_{bias}$ connected to the MQW diodes 110 and 120.

The operation of circuit 100 begins when the signal Run_In 152 is applied as an input to the control logic circuit 150. The control logic circuit 150 then increments the counter 180 from 0 to 32 as the signal Clock_In 152 is applied. The output 156 controls the multiplexing of this count through the multiplexer 170 to the digital-to-analog converter (DAC) 190 which causes the analog programmable power supply 210 to produce a monotonically increasing analog voltage $v_{bias}$ at its output 192. To this end, the operational amplifier 200, operating as a voltage follower, generates the output $V_{out}$, which controls the analog programmable power supply 210. $V_{bias}$, the photodiode bias voltage, is thus stepped by the analog programmable power supply 210 from 0 to a predetermined maximum value in 32 steps. As previously noted, the two photodiodes 110 and 120 are illuminated with equal intensity non-modulated beams. The photodiode 110 is biased at $V_{bias}$ and the photodiode 120 is biased at $V_{bias}+V_{mod}$ where $V_{mod}$ is typically a fixed voltage equal to the optical modulator voltage swing available or desired for a given transmitter circuit. For example, where the swing is desired to be 0 to $6V_{mod}$ will equal 6V. Since the bias voltages are different for the photodiodes 110 and 120, the generated photocurrents, I1 and I2 input to the operational amplifier 130, will also differ. This difference is converted into a voltage by the operational amplifier 130. At each value of the counter 180, the voltage output of the operational amplifier 130 is compared to the reference voltage value stored by sample and hold capacitor $C_{hold}$. The reference voltage value on $C_{hold}$ will correspond to the maximum differential photocurrent detected during a cycle of the counter 180 incrementing from 0 to 32. If upon a sampling, the new value of differential photocurrent is larger than the reference value, then the new value becomes the reference and is stored by the capacitor $C_{hold}$. In addition, the counter value corresponding to the new reference voltage will be stored in the register 160 whenever a new reference value of the differential photocurrent is found. After the counter 180 has completed the cycle of incrementing from 0 to 32, the reference voltage $C_{hold}$ and the value stored in the register 160 will directly relate to the bias voltage, $V_{bias}$, which gave the maximum differential photocurrent. Once the circuit 100 has finished operation, the value in the register 160 can be routed to the digital-to-analog converter 190 via the multiplexer 170. This sets $V_{bias}$ to the value where the maximum differential photocurrent was obtained. Optical modulation can then commence with the appropriate operating voltages for a given temperature and wavelength of operation. The bias voltage $V_{bias}$ can be redetermined at predetermined intervals, or as the temperature, or wavelength of operation change.

Figure 3:
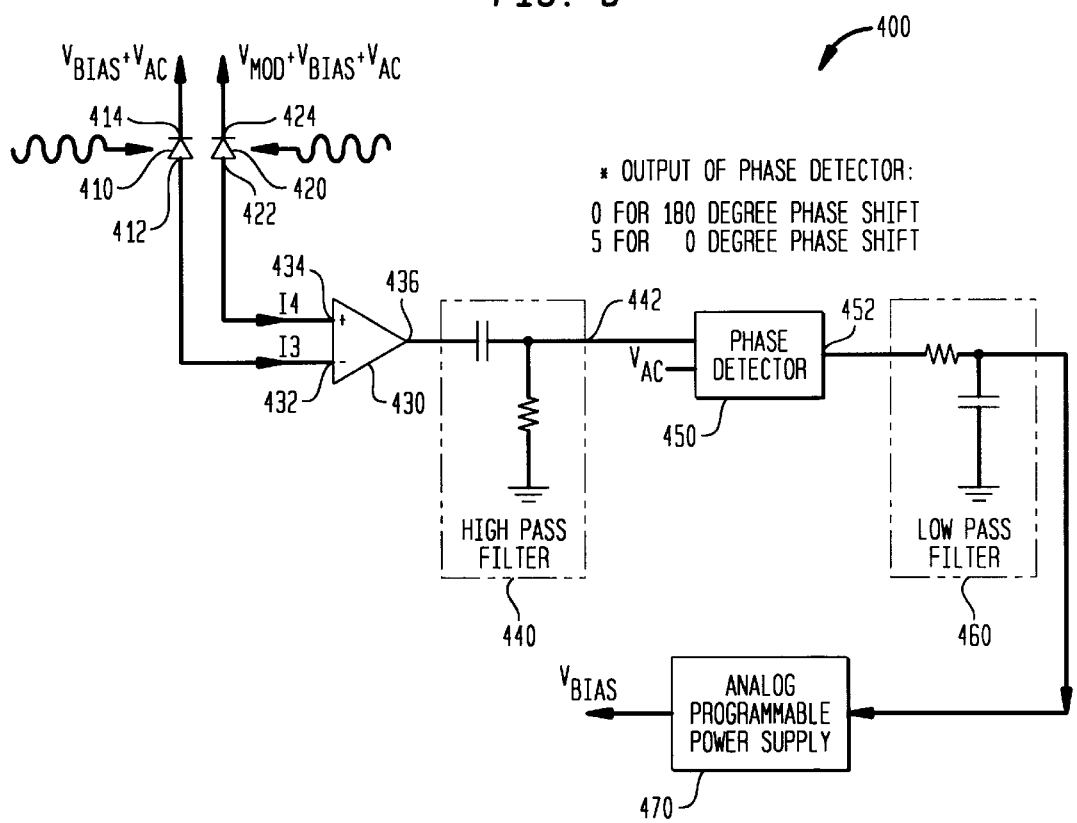
FIG. 3 is a schematic diagram of an analog implementation of an automatic bias setting circuit in accordance with the present invention.

FIG. 3 is a schematic diagram of an analog implementation of an automatic bias setting circuit 400 in accordance with the present invention. The exemplary circuit 400 includes two photodiodes 410 and 420. A first terminal 412 of the photodiode 410 is connected to a first input 432 of an operational amplifier 430, while another terminal 414 is biased at a voltage level $V_{bias}$, a DC voltage, plus an alternating current voltage $V_{ac}$. A first terminal 422 of the photodiode 420 is connected to a second input 434 of the operational amplifier 430, while another terminal 424 is biased at a voltage level $V_{bias}+V_{mod}+V_{ac}$. An output 436 of the operational amplifier 430 connects to an input of a high-pass filter 440. An output 442 from the high-pass filter 440 is connected to an input of a phase detector circuit 450, which also has as an input the alternating current voltage $V_{ac}$. An output 452 of the phase detector 450 is connected to a low-pass filter 460. An output of the low-pass filter 460 is in turn connected to an input of an analog programmable power supply 470, which produces the voltage level, $V_{bias}$.

The circuit 400 begins operation with the two photodiodes 410 and 420 being illuminated with equal intensity non-modulated beams of light. The photodiode 410 is biased at $V_{bias}+V_{ac}$ and the photodiode 420 is biased at $V_{bias}+V_{mod}+V_{ac}$. $V_{mod}$ is again typically the optical modulator voltage swing available or desired for a given transmitter circuit. $V_{ac}$ is an alternating voltage signal. Since the bias voltages are different for the photodiodes 410 and 420, the generated photocurrents, I3 and I4, will also differ. Due to the alternating voltage $V_{ac}$, the photocurrents I3 and I4 will have an alternating component also. The photocurrent difference will be in phase with the voltage $V_{ac}$ if the photocurrent difference, ΔI, increases with $V_M$ as in FIG. 1 for $V_{bias}+V_{mod}$ less than $V_{Peak}$. When $V_{bias}$ is greater than $V_{PEAK}$, the photocurrent difference will be out of phase with $V_{ac}$, due to the inverse relationship between photocurrent difference and voltage when the bias voltage is greater than $V_{PEAK}$ as shown in FIG. 1. The current difference between I3 and I4 is converted into a voltage by the operational amplifier 430. If the photocurrent difference is in phase with $V_{ac}$, the voltage at the output 436 will be in phase with $V_{ac}$. If the photocurrent difference is 180 degrees out of phase with $V_{ac}$, the voltage at the output 436 will be 180 degrees out of phase with $V_{ac}$. The output 436 of the operational amplifier 430 is passed through the high-pass filter 440, removing any DC and low frequency components, before the signal at the output 442 becomes an input to the phase detector 450. The phase detector 450 compares $V_{ac}$ with the signal at the output 471 and forces the output 452 to 5 volts if the two signals are in phase (0 degree phase shift) or to 0 volts if the two signals are not in phase (180 degree phase shift). A low-pass filter 460 with a large capacitor significantly slows the rise and fall times of the signal at output 452 before it is used to drive the analog programmable power supply 470, the generator of $V_{bias}$. Thus, from a low initial value, $V_{bias}$ will increase until it is slightly greater that $V_{PEAK}$. Then, as the phase of the photocurrent difference changes, $V_{bias}$ will decrease until it is slightly less than $V_{PEAK}$. $V_{bias}$ will then continue to oscillate slightly around $V_{PEAK}$, but the desired $V_{bias}$ will be detected and maintained.

Figure 4:
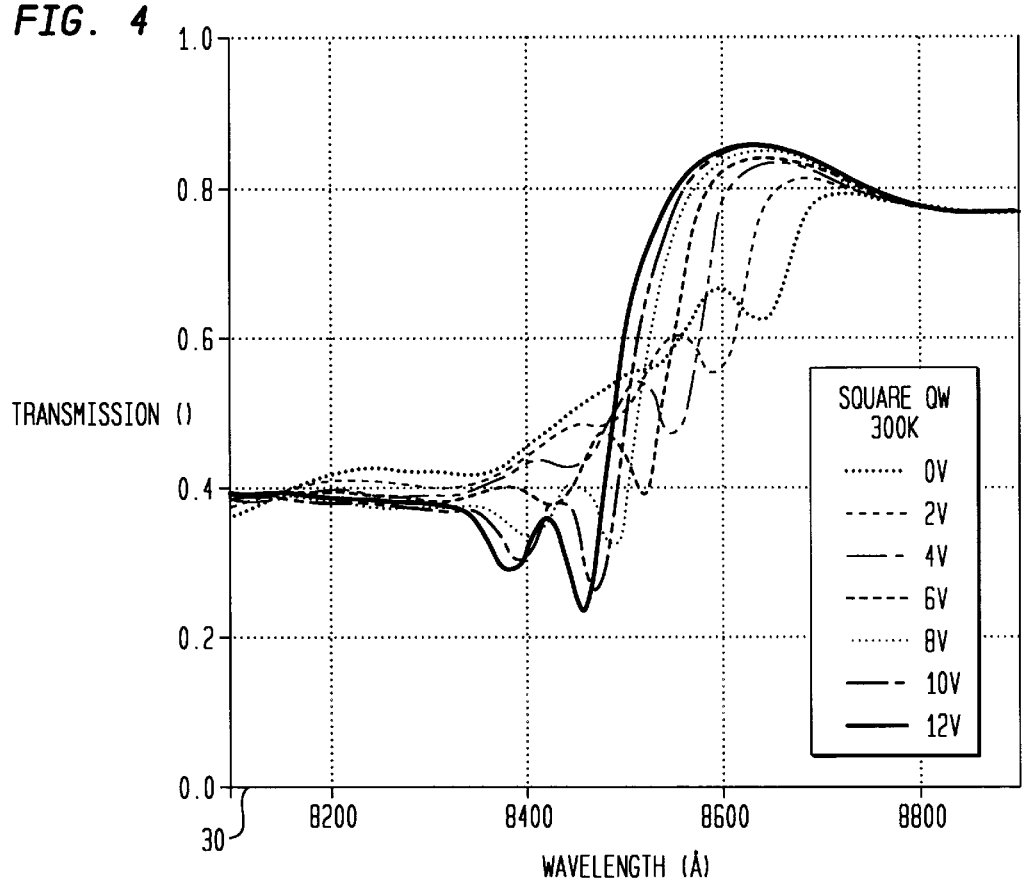
FIG. 4 is a graph showing the relationship between the intensity of optical transmission and wavelength for different applied biases for an optical modulator.

FIG. 4 is a graph 30 showing the relationship between the optical transmission and wavelength for different applied biases for an optical modulator operating in the 850 nm band. The optical modulator has an optical transmission or reflection that depends on the voltage applied to the device. Operating between two discrete states, one of low reflectivity and the other of high reflectivity, a large change in the optical transmission from the modulator can be obtained. It is readily seen that different bias levels are more appropriate for different wavelengths of illumination and for different operating temperatures.

Figure 5:
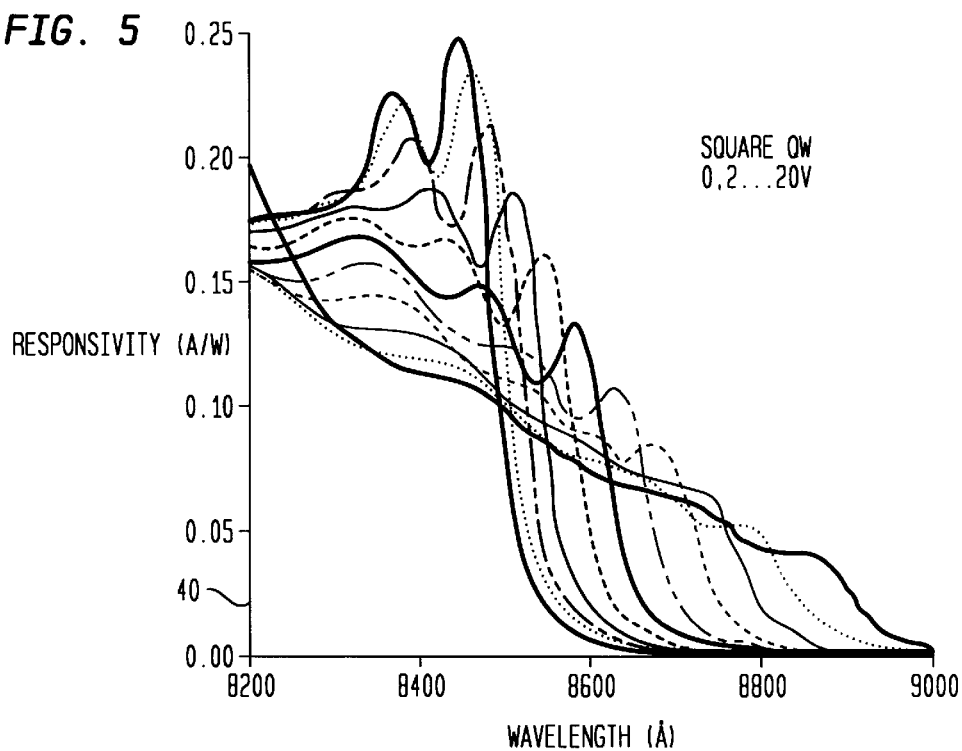
FIG. 5 is a graph showing the responsivity of the optical modulator whose transmission performance was shown in FIG. 4.

FIG. 5 is a graph 40 showing the responsivity of an optical modulator whose transmission performance was shown in FIG. 4. The responsivity is directly proportional to the photocurrent through an optical modulator, and varies with the voltage bias level applied to the modulator.

Figure 6:
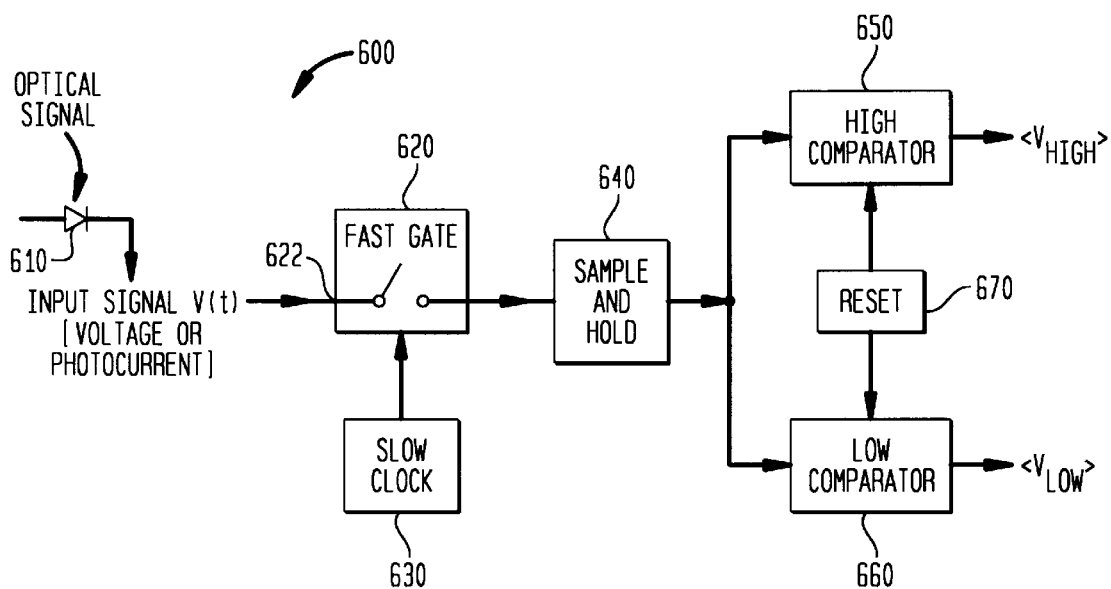
FIG. 6 is a schematic diagram of a data rate independent high and low voltage level detector in accordance with the present invention.

In some cases, it may be desirable to monitor the high and low states output from the modulator. FIG. 6 is a schematic diagram of an exemplary circuit 600 which uses the photocurrent through a photodiode to determine the high and low voltage levels achieved by a modulated signal. The circuit 600 includes a fast photodiode 610 with a terminal 612. The photodiode 610 is the functional equivalent of an optical modulator for the purposes of measuring photocurrent, and photodiode 610 may be used to monitor the transmission or reflection of an optical modulator which is non-absorption based to determine the optimal operating voltage levels of the non-absorption based optical modulator by monitoring the reflection as the modulating voltage is varied. The terminal 612 of photodiode 610 is connected to an input 622 of a fast gate 620. A slow clock 630 also provides an input to the fast gate 620. An output of the fast gate 620 connects to an input of a sample and hold circuit 640. An output of the circuit 640 is connected to inputs of a high comparator 650, with output $V_{high}$ and a low comparator 660, with output $V_{low}$. A reset circuit 670 also connects to both of these comparators.

An input signal V(t), which is directly proportional to the photocurrent, is periodically sampled by the fast gate 620. Alternatively, the photocurrent may be sampled. The sample rate provided by the slow clock 630 is unimportant, assuming the sample time is short compared to the fastest data traffic rate. The sampled voltages are sent to the high and low comparators 650 and 660, which hold in local memory an initial value which is updated as higher or lower values are sampled as discussed further below. The high comparator 650 compares a sampled voltage with its present stored value. If the sampled voltage is higher than the stored value, the sampled value replaces the stored value in local memory. The low comparator 660 compares a sampled voltage with the stored value. If the sampled voltage is lower than the stored value, the sampled value replaces the stored value in local memory. The comparators are periodically queried or read out to reveal the current $V_{high}$ and $V_{low}$ values and then reset (with 0 for the high comparator 650 and an appropriately large or high voltage value for the low comparator 660) to start collecting the next data point. $V_{high}$ and $V_{low}$ can also be used to calculate the average optical modulation imposed on a high-speed data stream to provide a measure of signal quality.

Figure 7:
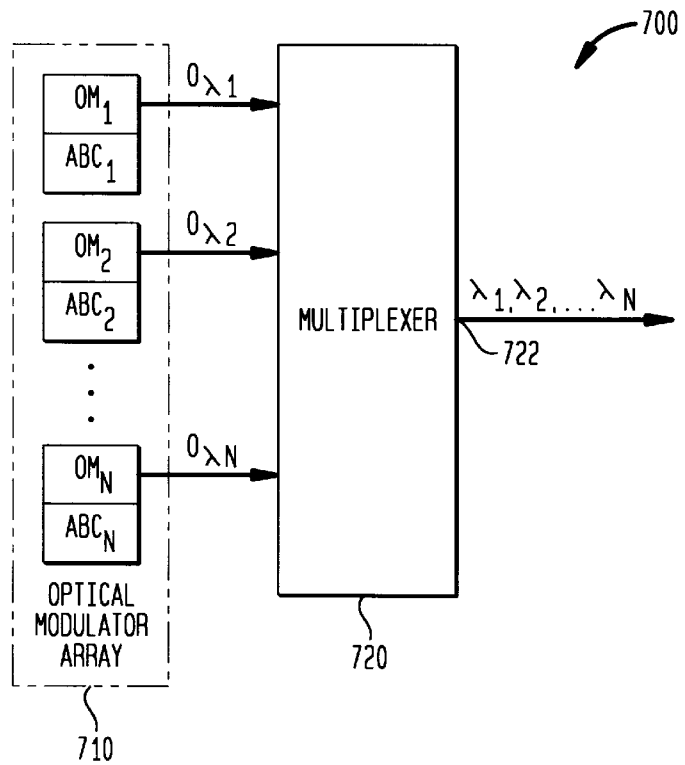
FIG. 7 is a diagram of a wavelength division multiplexed transmission system utilizing automatic bias setting circuits to control an array of optical modulators in accordance with the present invention.

FIG. 7 is a diagram of an exemplary circuit 700 which shows a wavelength division multiplexed transmission system utilizing automatic bias setting of optical modulators. An optical modulator array 710 is composed of N optical modulators, $OM_1$, $OM_2$, ... $OM_N$, coupled with N automatic bias setting circuits, $ABC_1$, $ABC_2$, ... $ABC_N$, respectively. Each optical modulator's output signal ($O_{\lambda 1}$, $O_{\lambda 2}$, ... $O_{\lambda N}$) connects as an input to a multiplexer 720, which has an output 722.

Since each of the N optical modulators operates at a different wavelength ($\lambda_1$, $\lambda_2$, ... $\lambda_N$ for the optical modulators $OM_1$, $OM_2$, ... $OM_N$, respectively, a separate automatic bias setting circuit, such as circuit 100 or circuit 400, is applied with each modulator. Alternatively, one or more automatic bias setting circuits may be switched or multiplexed with a larger number of optical modulators. Each optical modulator works in conjunction with an automatic bias setting circuit which determines and controls the bias level at which the optical modulator will exhibit the maximum difference in transmitted (or reflected) light for the particular wavelength at which it operates. For example, the bias level of the optical modulator $OM_1$ is determined and set by automatic bias setting circuit $ABC_1$ for optimum operation while transmitting at wavelength $\lambda_1$. The multiplexer 720 then combines the output signals $O_{\lambda 1}$, $O_{\lambda 2}$, ... $O_{\lambda N}$ into a single data stream at the output 722 for wavelength division multiplexed transmission.

Figure 8:
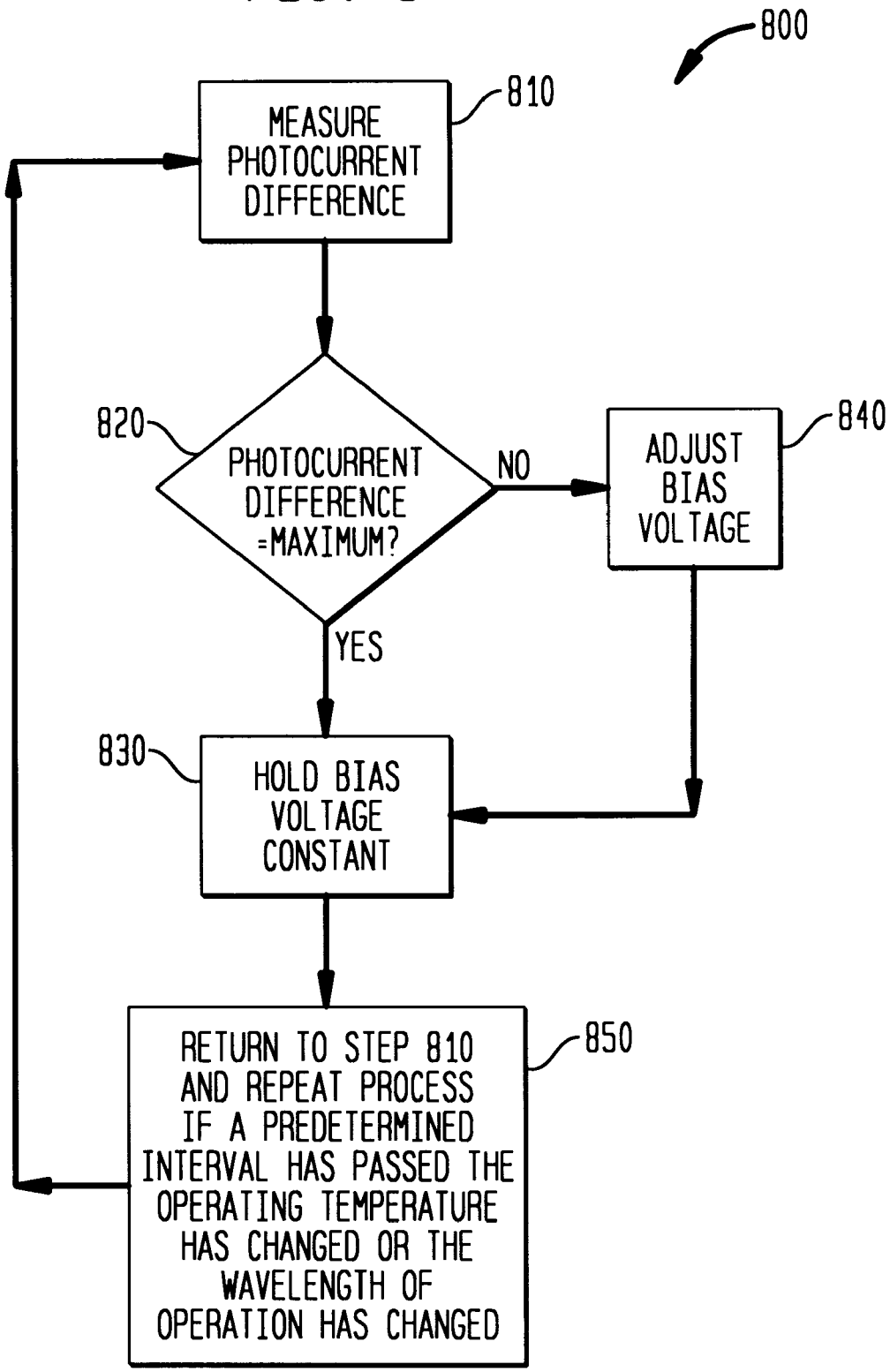
FIG. 8 is a flow chart of the steps of a method for automatically determining and controlling the bias levels at which an optical modulator will exhibit the maximum difference in transmitted or reflected light in accordance with the present invention.

FIG. 8 shows a flow chart illustrating the steps of a method 800 for automatically determining and controlling the bias levels at which an optical modulator will exhibit the maximum difference in transmitted (or reflected) light for a given voltage difference or range of operating voltage levels. First, as shown in step 810, the photocurrent difference between the high and low modulation states in an optical modulator is measured. Next, as shown in step 820, the value of the photocurrent difference present in an optical modulator for a given bias voltage is compared to the maximum measured photocurrent difference as the bias voltage is adjusted. If the photocurrent difference is already at a maximum, the bias voltage on the optical modulator is not adjusted in step 830. If the photocurrent difference is not at the maximum level possible, the bias voltage is adjusted to achieve the maximum photocurrent difference as shown in step 840 and the bias voltage is then again held constant in step 830. In step 850, the process 800 returns to step 810 and the process is repeated after a predetermined period of time has passed, the operation temperature has changed or the wavelength of operation has changed. The bias voltage will then be adjusted to the new level appropriate under the present operating conditions.

While the present invention has been disclosed in a presently preferred context, it will be recognized that it may be readily applied in a variety of contexts consistent with the present teachings and the claims which follow. By way of example, the present invention may be applied to the automatic determination and adjustment of the operating voltage levels for any large signal modulation of optical modulators whose response varies significantly with the frequency or temperature of operation as different operating voltages are employed.

We claim:

1. A method for establishing operating voltage levels for an optical modulator operating at a given temperature and wavelength, the method comprising the steps of determining a desired modulation voltage range (0–$V_m$); and automatically determining a bias voltage ($V_{bias}$) which when added to the desired modulation voltage range results in the operating voltage levels ($V_{bias}$ and $V_{bias}$+ $V_m$) for the optical modulator operating at the given temperature and wavelength, such that the optical modulator operating at said operating voltage levels produces a substantially maximum difference in light transmitted between a non-absorbed optical carrier signal and an absorbed carrier signal.

2. The method of claim 1 further comprising the step of: redetermining said bias voltage after the given temperature has changed.

3. The method of claim 1 further comprising the step of: redetermining said bias voltage after the given wavelength has changed.

4. The method of claim 1 further comprising the steps of: applying the operating voltage levels to control modulation of the optical modulator; and
utilizing the optical modulator in an optical communication system.

5. The method of claim 1 wherein the optical modulator is a normal incidence multiple quantum well optical modulator and the step of automatically determining the bias voltage is performed by measuring absorbed photocurrent in the optical modulator as the bias voltage is varied, and determining the bias voltage corresponding to maximum measured absorbed photocurrent difference between the operating voltage levels.

6. The method of claim 1 further comprising the steps of: establishing operating voltage levels for a plurality of additional optical modulators operating at a plurality of different wavelengths; and
utilizing the optical modulator and the plurality of additional optical modulators in a wavelength division multiplexed optical communication system in which each optical modulator is modulated utilizing operating voltage levels appropriate to its operating wavelength.

7. The method of claim 1 wherein the operating voltage levels are appropriate for large signal modulation wherein all the difference between levels exceed one volt.

8. A method of automatically adjusting the operating voltage levels of an optical modulator for optimum response over a range of monochromatic signal wavelengths and temperatures of operation comprising the steps of:
automatically determining the operating voltage levels for a first wavelength and temperature of operation, such that the optical modulator operating at said operating voltage levels produces a substantially maximum difference in light transmitted between a non-absorbed optical carrier signal and an absorbed carrier signal;
automatically adjusting the operating voltage levels as the wavelength and or temperature of operation change, such that the optical modulator operating at said adjusted operating voltage levels produces said substantially maximum difference in light.

9. The method of claim 8 wherein the step of automatically determining the operating voltage levels for a first wavelength and temperature of operation further comprises the steps of measuring the absorbed photocurrent over a range of applied voltages and determining the operating voltage levels for which the absorbed photocurrent difference is a maximum.

10. A method of automatically adjusting the operating voltage levels of an optical modulator for optimum response over a range of monochromatic signal wavelengths and temperatures of operation comprising the steps of:
automatically determining the operating voltage levels for a first wavelength and temperature of operation, such that the optical modulator operating at said operating voltage levels produces a maximum difference in modulated light transmitted between a non-absorbed optical carrier signal and an absorbed optical carrier signal;

automatically adjusting the operating voltage levels as the wavelength and or temperature of operation change, such that the optical modulator operating at said adjusted operating voltage levels produces a maximum difference in modulated light transmitted between a non-absorbed optical signal and an absorbed carrier signal;

wherein the step of automatically determining comprises the sub-steps of:

employing a first monitor photodiode and a second monitor photodiode;

applying a first predetermined voltage to the first monitor photodiode;

applying the first predetermined voltage plus a second voltage to the second monitor photodiode;

exposing the first and second monitor photodiodes to an optical source of light of a first wavelength;

measuring the difference between the absorbed photocurrents for the first and second monitor photodiodes;

varying the second voltage;

measuring the difference between the absorbed photocurrents as the second voltage is varied; and determining the value of the second voltage corresponding to the maximum difference between the absorbed photocurrents.

11. The method of claim 10 comprising the step of redetermining the value of the second voltage corresponding to the maximum difference between the absorbed photocurrents after a predetermined interval of time has passed.

12. An apparatus for automatically establishing operating voltage levels for an optical modulator operating at a given temperature and wavelength, the apparatus comprising:

means for applying a desired modulation voltage range $(0-V_m)$; and means for automatically determining a bias voltage $(V_{bias})$ which when added to the desired modulation voltage range results in the operating voltage levels $(V_{bias}$ and $V_{bias}+V_m)$ for the optical modulator operating at the given temperature and wavelength, such that the optical modulator operating at said operating voltage levels produces a substantially maximum difference in light transmitted between a non-absorbed optical carrier signal and an absorbed carrier signal.

13. The apparatus of claim 12 further comprising the step of:

means for automatically redetermining said bias voltage after the given temperature has changed.

14. The apparatus of claim 12 further comprising:

means for automatically redetermining said bias voltage after the given wavelength has changed.

15. The apparatus of claim 12 further comprising:

means for applying the operating voltage levels to control modulation of the optical modulator whereby the optical modulator is utilized in an optical communication system.

16. The apparatus of claim 15 wherein the operating voltage levels are appropriate for large signal modulation and the difference between levels exceeds one volt.

17. The apparatus of claim 12 wherein the optical modulator is a normal incidence high speed multiple quantum well optical modulator and the means for determining the bias voltage further comprises a circuit for measuring absorbed photocurrent for the optical modulator as the bias voltage is varied, and a logic control circuit for determining the bias voltage corresponding to maximum measured absorbed photocurrent.

18. The apparatus of claim 12 further comprising:

means for establishing operating voltage levels for a plurality of additional optical modulators operating at a plurality of different wavelengths whereby the optical modulator and the plurality of additional optical modulators are utilized in a wavelength division multiplexed optical communication system in which each optical modulator is modulated utilizing operating voltage levels appropriate to its operating wavelength.

19. An apparatus for automatically adjusting the operating voltage levels of an optical modulator for optimum response over a range of monochromatic signal wavelengths and temperatures of operation comprising:

means for automatically determining the operating voltage levels for a first wavelength and temperature of operation, such that the optical modulator operating at said operating voltage levels produces a substantially maximum difference in light transmitted between a non-absorbed optical carrier signal and an absorbed carrier signal; and means for automatically adjusting the operating voltage levels as the wavelength and or temperature of operation change, such that the optical modulator operating at said adjusted operating voltage levels produces a predetermined difference in modulated light.

20. The apparatus of claim 19 wherein the means for automatically determining the operating voltage levels for a first wavelength and temperature of operation further comprises a circuit for measuring the absorbed photocurrent over a range of applied voltages and determining the operating voltage levels for which the absorbed photocurrent difference is a maximum.

21. An apparatus for automatically adjusting the operating voltage levels of an optical modulator for optimum response over a range of monochromatic signal wavelengths and temperatures of operation comprising:

means for automatically determining the operating voltage levels for a first wavelength and temperature of operation, such that the optical modulator operating at said operating voltage levels produces a maximum difference in modulated light transmitted between a non-absorbed optical carrier signal and an absorbed optical carrier signal;

means for automatically adjusting the operating voltage levels as the wavelength and or temperature of operation change, such that the optical modulator operating at said adjusted operating voltage levels produces a maximum difference in modulated light transmitted between a non-absorbed optical signal and an absorbed carrier signal;

wherein the means for automatically determining comprises:

a first monitor photodiode and a second monitor photodiode;

a supply for applying a first predetermined voltage to the first monitor photodiode;

a supply for applying the first predetermined voltage plus a second voltage to the second monitor photodiode;

an optical source of light of a first wavelength applied to the first and second monitor photodiodes;

circuitry for measuring the difference between the absorbed photocurrents for the first and second monitor photodiodes;

circuitry for varying the second voltage;

a circuitry for measuring the difference between the absorbed photocurrents as the second voltage is varied; and circuitry for determining the value of the second voltage corresponding to the maximum difference between the absorbed photocurrents.

22. The apparatus of claim 21 further comprising means for redetermining the value of the second voltage corresponding to the maximum difference between the absorbed photocurrents after a predetermined interval of time has passed.

23. A method of automatically adjusting the operating voltage levels of an optical modulator for optimum response over a range of monochromatic signal wavelengths and temperatures of operation comprising the steps of:

automatically determining the operating voltage levels for a first wavelength and temperature of operation, such that the optical modulator operating at said operating voltage levels produces a maximum difference in modulated light transmitted between a non-absorbed optical carrier signal and an absorbed optical carrier signal;

automatically adjusting the operating voltage levels as the wavelength and or temperature of operation change, such that the optical modulator operating at said adjusted operating voltage levels produces said maximum difference in modulated light transmitted between a non-absorbed optical carrier signal and an absorbed optical carrier signal;

wherein the step of automatically determining includes the sub-steps of:

employing a first monitor photodiode and a second monitor photodiode;

applying a first direct current (DC) voltage plus an alternating current (AC) voltage to the first monitor photodiode;

applying the first direct current (DC) voltage plus the alternating current (AC) voltage plus a second direct current (DC) voltage to the second monitor photodiode;

exposing the first and second monitor photodiodes to an optical source of light of a first wavelength;

measuring a photocurrent difference between the absorbed photocurrents for the first and second monitor photodiodes;

increasing the second direct current (DC) voltage if the phase of the photocurrent difference is in phase with the alternating current (AC) voltage; and decreasing the second direct current (DC) voltage if the phase of the photocurrent difference is not in phase with the alternating current (AC) voltage.

* * * * *